Figures 1, 2:
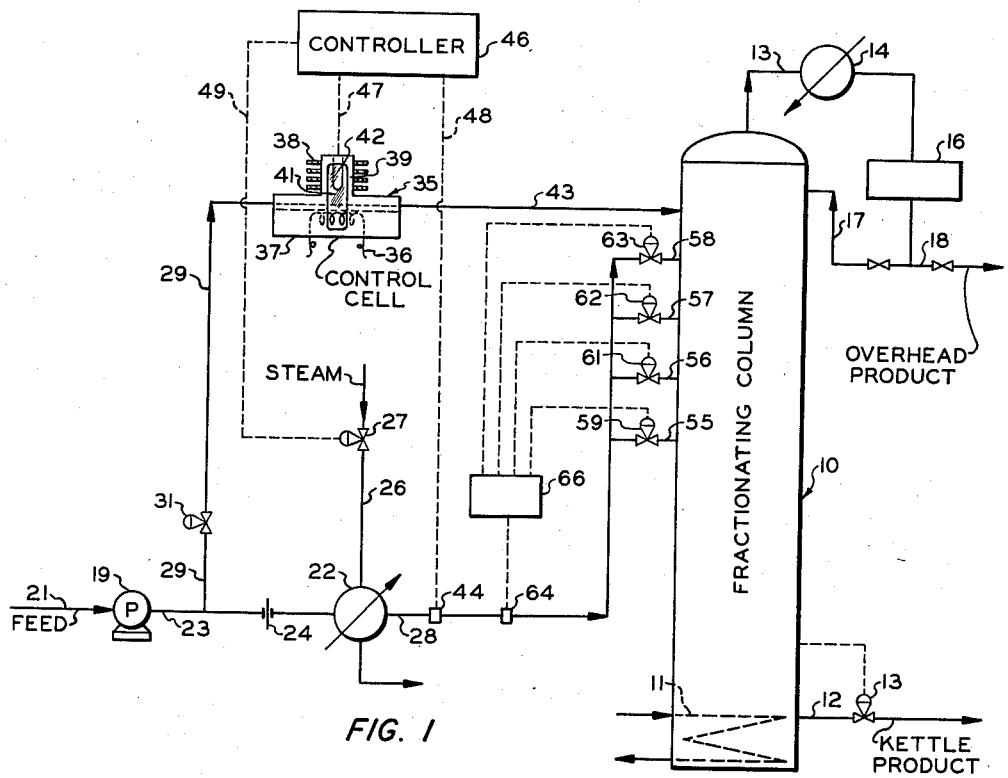

April 26, 1960　　　G. W. HANTHORN　　　2,933,900
FRACTIONATOR FEED CONTROL
Filed Oct. 9, 1957

INVENTOR.
G.W. HANTHORN
BY Hudson and Young
ATTORNEYS

2,933,900
FRACTIONATOR FEED CONTROL

George W. Hanthorn, Bartlesville, Okla., assignor to Phillips Petroleum Company, a corporation of Delaware Application October 9, 1957, Serial No. 689,202

11 Claims. (Cl. 62—21)

This invention relates to a fractionation system, and a method of fractionating streams containing a plurality of components.

In the operation of fractionation columns, feed to be separated into a high boiling fraction and a low boiling fraction is fed to a column which is heated at the bottom and cooled at the top with resulting separation of the feed into a heavy or kettle product and a light or overhead product. In the fractionation column, repeated vaporization and condensation of the feed takes place and, at each level in the column, the material has a definite composition which is related to the temperature at that point, the temperature, of course, decreasing as the top of the column is approached, and the composition becoming progressively denuded of the heavier materials.

When a fractionation column is operated to produce a maximum degree of separation, as much heat as possible is applied to the column for satisfactory operation which in turn requires a certain amount of reflux in order to divide the feed into a given ratio of kettle produce and overhead product. In order to obtain the maximum degree of separation, the feed to the column should be heated as near to the bubble point on the feed tray as possible and the additional heat added in the kettle of the fractionator. When operating in this manner, the column operates under maximum vapor load; that is, if the vapor load is increased, the column will flood. By operating the column to obtain the maximum degree of separation, the vapor load above the feed tray and below the feed tray is maintained at maximum column capacity. If the feed is fed to the column above the bubble point, then it is necessary to add less heat to the kettle and, therefore, the vapor load below the feed tray will be less than maximum column capacity. If the feed is fed to the column below the bubble point on the feed tray, it is necessary to increase the rate of addition of heat to the kettle and, therefore, the part of the column below the feed tray will operate at maximum vapor load and the part of the column above the feed tray will operate below maximum column vapor capacity. Therefore, it can be seen that to obtain the maximum degree of separation when operating a fractionation column, the feed should be fed to the column at its bubble point within the column, regardless of the feed rate and composition, and the rate of addition of heat to the kettle should be maintained great enough that the column operates under maximum vapor capacity. It can be further stated that the maximum degree of separation could be more nearly obtained if the feed to a fractionation column were heated to the bubble point of the feed on the feed tray at all times.

If the feed preheater or kettle heater are of undercapacity then it may be desirable to either heat the feed above the bubble point or adde more heat than usual to the kettle. The bubble point, as defined herein, means the temperature at which the vaporization of the material is incipient, that is, a temperature where some bubbles form but there is no substantial evolution of vapor. Thus, if the feed enters the column above the bubble point, vapors are admixed therewith and these vapors must be recondensed in the column before proper separation can be effected. Further, in many instances, particularly where the column is operated at full capacity, the downcomer of the feed introduction ray is of just sufficient size to handle the required liquid flow therethrough and presence of substantial quantities of vapors in the feed substantially interferes with the operation of this downcomer unit especially if the feed enters directly over a downcomer. Conversely, if the vapors enter substantially below the bubble point, the feed must be heated appreciably within the column before vaporization will commence, thus again decreasing the efficiency of the fractionation operation. Thus, for most efficient operation of a fractionation column at maximum throughput, the feed should be introduced at its bubble point.

Heretofore, fractionators have ordinarily been operated to maintain a predetermined feed temperature, for example, the bubble point of a feed mixture of assumed composition at the column pressure. It will be evident that slight changes in the feed composition, particularly of the lighter components thereof, will change the bubble point so that, whenever the feed composition is different from its assumed composition, the column is not operated at maximum efficiency. In particular, where the column is operated at high throughput, such variations in feed compositions can cause serious upsets in column operation resulting, for example, in excessive entrainment of liquid in the ascending vapors.

In accordance with this invention, the temperature of the feed is not preset but, rather, it is automatically regulated so that the feed enters the column at its bubble point despite variations in feed composition and the point of introduction to the column is varied as the feed temperature varies. This is accomplished by dividing the feed stream into major and minor portions and heating the major portion to a point at or near the bubble point. Control of this heating is provided by introducing the minor portion of the feed into a control cell wherein liquid and vapor phases are maintained. These two phases are maintained by heating the lower portion of the cell and cooling the upper portion thereof. With both liquid and vapor phases present, the temperature of condensing liquid in the upper portion of the control cell is measured, this being the bubble point of the feed. The temperature of the major portion of the feed is also measured and, the amount of heating is adjusted by a difference in temperature controller which measures the temperature of the condensing liquid in the upper portion of the control cell and the temperature of the major portion of the feed. By this system the temperature of the major portion of the feed can be adjusted to compensate for changes in the composition of the feed.

One particular situation in which the invention can be used is at the terminal of a products pipe line in which various products are transmitted. For instance, a shipment of $C_3$ hydrocarbons may follow a shipment of $C_4$ hydrocarbons. More specifically, a shipment of propane may frequently be preceded and followed by a shipment of butane. In such a case there is some contamination at the interface and fractionation of the contaminated portion is necessary at the terminal.

Although, as previously noted, the most advantageous operation is obtained where the feed enters the column at the bubble point, in some cases, it is desirable that the feed enter at a fixed predetermined number of degrees above or below the bubble point. For example, if the kettle heater has a small capacity, it is desirable to operate with the feed at a temperature above the bubble point or, if it is desired to cut down the reflux rate, it is desirable that the feed enter at a temperature below the bubble point. However, in either case, to prevent column upsets, if the bubble point of the feed changes due to a change in composition, the preset temperature should change in a corresponding manner so that the feed is maintained at "X" degrees from the bubble point. This result is accomplished by the control system of the invention.

The following are objects of this invention.

An object of my invention is to provide an improved fractionation system.

It is a further object to provide an improved fractionation process.

It is a still further object to provide a system wherein the feed is introduced at its bubble point (boiling point), or at a temperature a predetermined number of degrees above or below the bubble point, despite changes in feed composition.

It is a further object to provide a system wherein a fractionation column produces a maximum degree of separation by operating the column at its maximum vapor load at all times, and with the feed entering the column at its bubble point on the feed tray.

A further object of my invention is to provide an improved system for separating butane and propane.

Other objects and advantages of this invention will be apparent to one skilled in the art upon reading this disclosure, accompanying which and forming a part thereof is a drawing comprising Figure 1, a flow diagram of fractionation system constructed in accordance with this invention, and Figure 2, a detailed view of the feed control system to the column.

In Figure 1 I have shown a fractionation column 10 having a heater 11 in the kettle portion thereof through which steam is passed although other systems of supplying heat to the lower portion of the column can be used. As is standard, there is provided a kettle product removal conduit 12 having a control valve 13 to regulate removal of this product. There is also provided an overhead removal conduit 13, this conduit being provided with a cooler or condenser 14, an overhead accumulator 16, a reflux return conduit 17 and an overhead product conduit 18.

From any suitable source (not shown) the feed is supplied to pump 19 by means of conduit 21. From the pump the feed passes to heater 22 by means of conduit 23 having orifice 24 therein. Heater 22 is supplied with steam for indirect heat exchange by means of conduit 26 having diaphragm motor valve 27 therein, this valve being operated as hereinafter described. The feed, after being heated, is passed from heater 22 to fractionation column 10 by means of conduit 28.

The portion of the product fed to fractionation column 10 through conduit 28 is the major portion of the feed. The remaining and minor portion of the feed is passed by means of conduit 29 having valve 31 therein to the control cell 35. Orifice 24 provides a positive pressure differential to insure flow of liquid through conduit 29. Generally it is necessary to feed only 0.1 to 2 gallons per minute to the control, it only being necessary to provide enough that there will be some, but not complete, vaporization. Control cell 35 is provided with heating means 36 in the lower portion thereof 37 and cooling means 38 in the upper portion 39. Depending upon the feed and operating conditions various amounts of heating and cooling are necessary and, frequently, cooling fins on this upper portion are sufficient. For greater cooling a cooling fluid can be circulated therein. A sight glass 41 is provided in the control cell in order that it may be ascertained that both liquid and vapor phases are present and that condensation is taking place in the upper portion 39 of the control cell. The upper portion of the control cell is also provided with temperature sensing means 42.

Extending from control cell 35 is a conduit 43 which communicates, preferably horizontally, with the upper portion of the fractionation column. Flow through the control cell is so small that changes in composition of the feed do not appreciably affect the column operation.

Located in line 28 is a second temperature sensing element 44, this element being provided to determine the temperature of the feed. The temperatures from elements 42 and 44 are fed to a differential temperature controller 46 by means of lines 47 and 48. Many such controllers are commercially available, one being the Foxboro Dynalog M/40 pneumatic controller, which is described in Foxboro Bulletin 20–10 (1957). This controller, by means of line 49, operates diaphragm motor valve 27 in steam supply conduit 26.

In the operation of this system a change in the bubble point temperature is determined by sensing element 42 and, in turn, this results in a change in the setting of valve 27 in order to maintain a specific temperature relationship between this bubble point and the temperature of the feed as determined by temperature sensing element 44.

Obviously, it is desired to supply the feed to column 10 at the point in the column corresponding to the composition of the feed. For this reason I have provided a plurality of inlet conduits 55, 56, 57 and 58 extending from conduit 28 to column 10, these conduits being provided with valves 59, 61, 62 and 63, respectively. A second temperature sensing element 64 in conduit 28 is provided, the output being supplied to control apparatus 66 which in turn operates valves 59, 61, 62 and 63. In the operation as controller 46 raises the temperature of the feed, controller 66 regulates the point of introduction of the feed so that it is introduced at the proper point in the column.

Controller 66 is illustrated in Figure 2. In this figure temperature sensing element 64 comprises a bulb 67 in the path of the feed in conduit 28 which is, in turn, connected to bellows 68. The bulb is filled with an expansible fluid in order to move arm 69 carrying brush 70 upwardly as the temperature in conduit 28 increases. Brush 70 rides upon commutator segments 71, 72, 73 and 74. Each commutator segment is connected through a source of current 76 to solenoids 59', 61', 62', and 63'. These solenoids operate the previously mentioned valves 59, 61, 62 and 63.

The following separation of a mixture of propane and butane illustrates my invention. In one run, operation is started with 50/50 mixture of propane and butane which is fed to the column at a rate of 100 gallons per minute, the column operating at a top temperature of 124° F. and pressure of 232 pounds p.s.i.g. and a kettle temperature of 224° F. and a pressure of 240 pounds p.s.i.g. The column is provided with feed conduits at the 8th, 14th, 20th, 22nd, and 24th trays. The small portion of the feed (about one-half gallon per minute) passing through the control cell is partially vaporized and the temperature of the condensing vapors is approximately 160° F. For optimum operation, controller 46 then adjusts steam flow to provide a temperature of approximately 160° F. in conduit 28 and controller 66 is automatically operated to feed the major portion of the feed to the column at the point therein at which the temperature is approximately 160° F. As the feed changes to 95% propane by volume, the controller 46 adjusts the feed temperature to 129° F. and controller 66 adjusts the position of the feed to the column to the point nearest this feed temperature.

Thus it is apparent that this system provides a method by which the feed temperature is adjusted according to changes in the feed so as to be fed to the column at the optimum temperature for operation and at the optimum point for feed introduction.

As many possible embodiments can be made of this invention without departing from the scope thereof, it is to be understood that all matter herein set forth is to be interpreted as illustrative and not as unduly limiting the invention.

I claim:

1. In a fractionation process, the steps which comprise dividing a feed stream into a major portion and a minor portion, heating the major portion of a feed stream to be fractionated and introducing same into a fractionation zone and therein separating it into a kettle product and an overhead product, introducing the remaining part of the feed stream into a control zone, heating the lower portion and cooling the upper portion of the said control zone so as to provide condensing vapors in the upper portion of said control zone, measuring the temperature of said condensing vapors, measuring the temperature of said major portion of the heated feed stream, and adjusting the heat supplied in said heating step of said major portion to maintain a predetermined temperature relationship between the temperature of said major portion and said temperature of condensing vapors in said control zone.

2. The process of claim 1 wherein sufficient heat is supplied to said major portion that it enters the fractionation zone substantially at its bubble point at the prevailing pressure at the point at which said major portion enters said fractionation zone.

3. The process of claim 1 wherein sufficient heat is supplied to said major portion that it enters the fractionation zone substantially below its bubble point at the prevailing pressure at the point at which said major portion enters said fractionation zone.

4. The process of claim 1 wherein sufficient heat is supplied to said major portion that it enters the fractionation zone substantially above its bubble point at the prevailing pressure at the point at which said major portion enters said fractionation zone.

5. The process of claim 1 wherein said feed comprises predominantly a mixture of $C_3$ and $C_4$ hydrocarbons.

6. In a fractionation process wherein a feed comprising predominantly a mixture of $C_3$ and $C_4$ hydrocarbons is passed to a fractionation zone and therein separated into a predominantly $C_3$ overhead product and a predominantly $C_4$ kettle product, the improvement comprising dividing said feed into a major portion and a minor portion; passing said major portion in indirect heat exchange with heated steam and, thereafter, introducing the heated stream into said fractionation zone; introducing said minor portion into a control zone; heating the lower portion and cooling the upper portion of said control zone so as to provide condensing vapors in the upper portion of said control zone; passing said minor portion from said control zone to said fractionation zone; measuring the temperature of said condensing vapors in said control zone; measuring the temperature of said major portion of said feed; and adjusting flow of heated steam to said indirect heat exchange operation to maintain a predetermined temperature relationship between the temperature of the major portion of said feed, said temperature relationship being such that said major portion of said feed enters said fractionation zone at substantially the bubble point at the point of introduction.

7. In a fractionation process, the steps which comprise dividing a feed stream into a major portion and a minor portion, heating the major portion of a feed stream to be fractionated an introducing same into a fractionation zone and therein separating it into a kettle product and an overhead product, introducing the remaining part of the feed stream into a control zone, heating the lower portion and cooling the upper portion of said control zone so as to provide condensing vapors in the upper portion of said control zone, measuring the temperature of said condensing vapors, measuring the temperature of said major portion of the heated feed stream, adjusting the heat supplied in said heating step of said major portion to maintain a predetermined temperature relationship between the temperature of said major portion and said temperature of said condensing vapors in said control zone, and introducing said major portion of said feed into said column at a point at which the temperature of said column is substantially equal to the temperature of said major portion.

8. A fractionation system comprising a fractionation column; a first feed conduit communicating with said fractionation column; a heater in said first feed conduit; a control cell adjacent said fractionating column, said control cell being provided with heating means in the lower portion thereof and cooling means in the upper portion thereof; a conduit extending from said first feed conduit at a point upstream of said heater to said control cell; an outlet extending from said control cell; first temperature sensing means in the upper portion of said control cell; second temperature sensing means in said first feed conduit downstream of said heater; and control means adapted to adjust heat supplied to said heater in said first feed conduit to maintain a predetermined temperature relationship between said first and second temperature sensing means.

9. A fractionation system comprising a fractionation column; a first feed conduit communicating with said fractionation column; a heater in said first feed conduit; a control cell adjacent said fractionation column, said control cell being provided with heating means in the lower portion thereof and cooling means in the upper portion thereof; a conduit extending from said first feed conduit at a point upstream of said heater to said control cell; a conduit extending from said control cell to fractionation column; first temperature sensing means in the upper portion of said control cell; second temperature sensing means in said first feed conduit downstream of said heater; and control means adapted to adjust heat supplied to said heater in said first feed conduit to maintain a predetermined temperature relationship between said first and second temperature sensing means.

10. A fractionation system comprising a fractionation column; a first feed conduit communicating with said fractionation column; a heater in said first feed conduit; a control cell adjacent said fractionation column at a level substantially equal to the point of communication of said first feed conduit and said fractionation column, said control cell being provided with heating means in the lower portion thereof and cooling means in the upper portion thereof; a conduit extending from said first feed conduit at a point upstream of said heater to said control cell; first temperature sensing means in the upper portion of said control cell; second temperature sensing means in said first feed conduit downstream of said heater; a conduit extending substantially horizontally from said control cell to said fractionation zone; and control means adapted to adjust heat supplied to said heater in said first feed conduit to maintain a predetermined temperature relationship between said first and second temperature sensing means.

11. A fractionation system comprising a fractionation column; a first feed conduit communicating with said fractionation column; a heater in said first feed conduit; a control cell adjacent said fractionation column, said control cell being provided with heating means in the lower portion thereof and cooling means in the upper portion thereof; a conduit extending from said first feed conduit at a point upstream of said heater to said control cell; an outlet extending from said control cell; first temperature sensing means in the upper portion of said control cell; second temperature sensing means in said first feed conduit downstream of said heater; control means adapted to adjust heat supplied to said heater in said first feed conduit to maintain a predetermined temperature relationship between said first and second temperature sensing means; and means to adjust the point of communication of said first feed conduit with said fractionation column in response to changes in temperature of the material fed thereto.

References Cited in the file of this patent

UNITED STATES PATENTS

| | | |
|---|---|---|
| 2,069,490 | Fenske | Feb. 2, 1937 |
| 2,086,808 | Kallam | July 13, 1937 |
| 2,357,113 | Houghland et al. | Aug. 29, 1944 |
| 2,386,601 | Fisher | Oct. 9, 1945 |
| 2,419,529 | Biegel | Apr. 29, 1947 |
| 2,489,949 | Blair | Nov. 29, 1949 |
| 2,500,916 | Whaley | Mar. 14, 1950 |

FOREIGN PATENTS

| | | |
|---|---|---|
| 859,153 | Germany | Dec. 11, 1952 |
| 1,000,066 | France | Oct. 10, 1951 |